(12) United States Patent
Masson et al.

(10) Patent No.: US 12,179,890 B2
(45) Date of Patent: Dec. 31, 2024

(54) OFFSHORE PLATFORM WITH VERTICAL COLUMN ASSEMBLY

(71) Applicant: Oil States Industries, Inc., Arlington, TX (US)

(72) Inventors: Peter Craig Masson, Katy, TX (US); Jonathan Frederick Jury, Aberdeenshire (GB); Garry Robert Stephen, Aberdeenshire (GB); Ryan Aldus, Aberdeenshire (GB); Kirsten McNeill, Aberdeen (GB); Adnan Hossain, Aberdeen (GB); John Shanks, Banchory (GB)

(73) Assignee: Oil States Industries, Inc., Arlington, TX (US)

( * ) Notice: Subject to any disclaimer, the term of this patent is extended or adjusted under 35 U.S.C. 154(b) by 0 days.

(21) Appl. No.: 18/489,448

(22) Filed: Oct. 18, 2023

(65) Prior Publication Data

US 2024/0140566 A1    May 2, 2024

Related U.S. Application Data

(60) Provisional application No. 63/381,614, filed on Oct. 31, 2022.

(51) Int. Cl.
*B63B 35/44* (2006.01)
*B63B 21/50* (2006.01)
*E02B 17/00* (2006.01)

(52) U.S. Cl.
CPC ............ *B63B 35/44* (2013.01); *B63B 21/502* (2013.01); *E02B 17/00* (2013.01); *E02B 2017/0039* (2013.01); *E02B 2017/0065* (2013.01)

(58) Field of Classification Search
CPC ....... B63B 35/44; B63B 21/502; E02B 17/00; E02B 2017/0039; E02B 2017/0065
See application file for complete search history.

(56) References Cited

U.S. PATENT DOCUMENTS

| | | | | |
|---|---|---|---|---|
| 3,996,755 A | * | 12/1976 | Kalinowski | B63B 21/502 405/203 |
| 2010/0129160 A1 | * | 5/2010 | Bailey | B63B 21/502 405/223.1 |

(Continued)

FOREIGN PATENT DOCUMENTS

| | | |
|---|---|---|
| CN | 105179183 | 12/2015 |
| CN | 107021190 | 8/2017 |

(Continued)

OTHER PUBLICATIONS

Patent Cooperation Treaty; PCT/US2023/06293, Nov. 28, 2023, Invitation to Pay Additional Fees.

(Continued)

*Primary Examiner* — Stephen P Avila
(74) *Attorney, Agent, or Firm* — Morgan, Lewis & Bockius LLP

(57) ABSTRACT

An apparatus and methods for installation of an offshore platform for supporting equipment installations is provided. The apparatus includes a platform configured to support offshore equipment supported by a structure such as a modular column assembly. The modular column assembly can be comprised of main barrel joint bundles.

19 Claims, 15 Drawing Sheets

(56) References Cited

U.S. PATENT DOCUMENTS

| | | | |
|---|---|---|---|
| 2010/0316450 A1 | 12/2010 | Botwright | |
| 2011/0037264 A1* | 2/2011 | Roddier | B63B 39/03 |
| | | | 290/55 |
| 2011/0107951 A1* | 5/2011 | Vandenworm | B63B 39/00 |
| | | | 114/264 |
| 2012/0045345 A1 | 2/2012 | Horton, III et al. | |
| 2012/0093589 A1 | 2/2012 | Broughton et al. | |
| 2014/0044554 A1 | 2/2014 | Lafferty | |

FOREIGN PATENT DOCUMENTS

| | | |
|---|---|---|
| CN | 113848665 | 12/2021 |
| GB | 21282375 | 5/1987 |
| WO | 2012107196 | 8/2012 |
| WO | 2023178075 | 9/2023 |

OTHER PUBLICATIONS

Patent Cooperation Treaty; International Search Report and Written Opinion, PCT/US23/64293, Mar. 8, 2024.

\* cited by examiner

OFFSHORE PLATFORM WITH VERTICAL COLUMN ASSEMBLY

TECHNICAL FIELD

The present disclosure relates generally to offshore structures, and more particularly, to structures for supporting offshore wind turbines, oil and gas operations, desalination operations, substations, or similar equipment.

Within the embodiments described, there are multiple types of arrangements that provide a stable platform for mounting offshore equipment. While many types of equipment can be supported by the structure disclosed or installed using the steps disclosed herein, reference will be made to one such example—an offshore wind turbine installation. A person of ordinary skill would understand that other equipment can be affixed on the structure disclosed herein and should not be read out of the disclosure because one such example is given.

BACKGROUND OF THE INVENTION

For an offshore installation, generally, the arrangement of piles, underwater structures, and/or the platform type varies based on the depth of the installation. In the case of offshore wind developments, shallow depth installations, or those of less than about 50 meters are typically fixed to the seafloor by a rigid structure anchored by piles. Examples of structures that can be used in shallow waters may include, for example, monopiles, jacket structures, jack-up installations, and the like. However, the use of piles can be disadvantageous due to the noise pollution created during the installation of driven piles. As water depth increases beyond approximately 50 meters, the cost of fixed structures rapidly increases because of the additional material costs for the structure to sustain increased wave and current loads, and because the installation vessels required to perform the installation are significantly more expensive. Thus, currently floating platforms are used, or planned to be used, in deeper water.

In deeper water, typically greater than 50 meters water depth for wind developments, floating platforms can alternatively be used. These include, for example, barge, spar buoy, tension-leg platforms, semi-submersible platforms, and the like. The transition depth from fixed structures to floating platforms depends on the wind, wave and current at the site, the seafloor conditions, and economic considerations.

Floating platforms are subject to wave and current loading resulting in challenges that require additional costs to achieve the required stability for supporting equipment, such as a wind turbine, or require modifications to the equipment, or result in reduced operability or up-time for the equipment or additional maintenance and repair. Consequently, as water depth increases beyond 50 meters, or so, the cost of the installation increases significantly regardless of the use of traditional fixed structure or floating platform.

The economics of the offshore wind market requires that the cost of the structures or platforms be minimized. Water depths in the range of 50-150 meters represent a large market opportunity because of the shortcomings of both traditional fixed and floating platform installations and because in many locations ideal wind farm sites, i.e., that are easily accessible, located near available infrastructure, and out of public sight, are within this water depth range. Such transition water depth sites are available for installations in many offshore wind fields around the world, including in the North Sea, Baltic Sea, Celtic Sea, Irish Sea, Mediterranean, Eastern U.S. Seaboard, Gulf of Mexico, Yellow Sea, Taiwan Strait, South China Sea, and Bass Strait, among others. Because traditional fixed structures and floating platforms are not as economical in water depths in the range of 50-150 meters, and floating platforms do not perform as well in shallower waters, an improved solution is required. The current invention seeks to improve upon the use of and options available for installing structures, including for example, wind turbines, in these transition sites around the world.

SUMMARY OF THE INVENTION

One or more embodiments of the invention describe a structure for supporting offshore equipment, including for example wind turbines. One of skill in the art will appreciate that other similar installations could use one or more of the embodiments of the current invention, such as oil and gas operations, desalination operations, substations, or similar offshore operations.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION OF THE INVENTION

The present disclosure relates generally to offshore structures, and more particularly, to structures for supporting offshore wind turbines and other equipment. As described herein, embodiments of the offshore structure described herein improve upon the traditional offshore structure configurations, especially in transition sites between 50-150 meters water depth.

Overall Description of Structure

Figure 1:
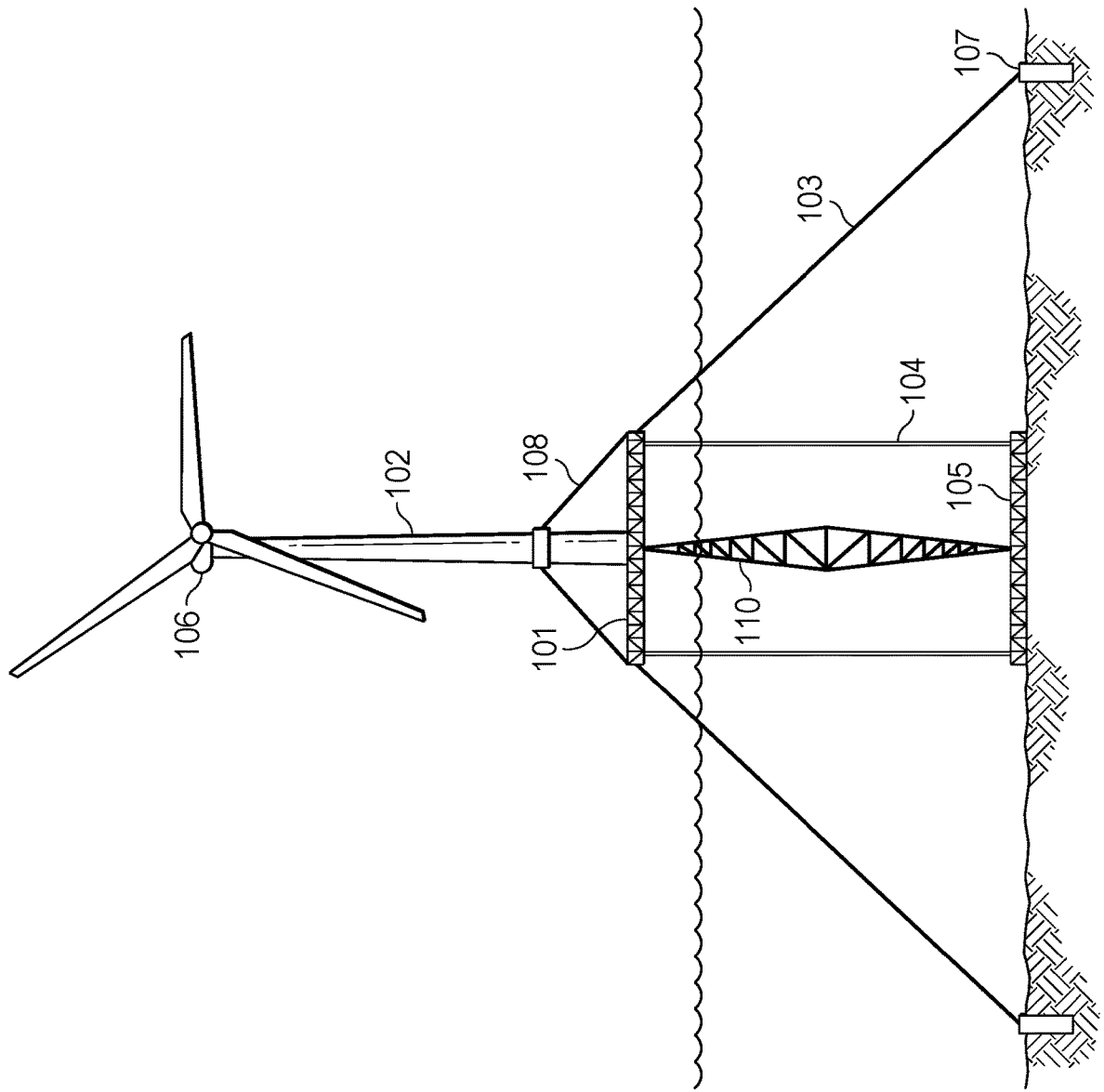
FIG. 1 depicts a schematic view of an offshore wind turbine installation, in accordance with embodiments of the present disclosure.

FIG. 1 provides a schematic view of an example configuration of an offshore installation to support offshore operations, in this example, a wind turbine 106, in accordance with the embodiments of the present disclosure. In the illustrated embodiment, a top frame structure 101 supports a wind turbine tower 102 and wind turbine 106. In the illustrated embodiments, stays 108 provide additional support to the wind turbine tower 102. In the illustrated embodiment, the top frame structure 101 is supported by a column assembly 110 and at least three tension lines 104. The column assembly (a space-frame in the embodiment shown in FIG. 1) 110 and tension lines 104 extend to the foundation 105 located on the seafloor.

The tension lines 104 are tensioned to a degree such that they will always remain in tension while in operation. The number of tension lines 104 and degree of tension of the tension lines 104 is determined based on the water depth, turbine size and the expected waves, currents, and wind patterns experienced at the site. Tension is conveyed to each tension line by way of its connection to a tendon attachment porch, as discussed below in more detail. In certain embodiments, the tension lines 104 may be adjustable and/or may include adjustable sections or adjustable connections to the top frame structure 101. The tension lines 104 have connection arrangements to the top frame structure 101 and the foundation 105. In some embodiments, the connections are shackles or flexible bearings. It would be understood by one of skill in the art that a hydraulic wedge jack system could be used to apply pre-tension to the tension lines. In other embodiments, a rotating step shim system could be preinstalled so the jack system could operate and rotate the step shim system to the correct position without the need for hydraulics.

In certain embodiments, the tension lines 104 are formed by a plurality of tension line inter joints that are connected together to form a tension line joint string.

The column assembly 110 supports the weight of the top frame structure 101, the wind turbine tower 102 and wind turbine 106, and facilitates tensioning of the tension lines 104. The tension lines 104 resist rotation of the top frame structure 101 due to wind loading on the turbine and thus maintain a stable platform, which is particularly advantageous in applications supporting a wind turbine or other sensitive equipment. The top frame structure 101 is supported laterally by taut mooring lines 103. In the illustrated embodiment, the top frame structure 101 is supported by at least three mooring cables 103. In certain embodiments, three pairs of mooring cables 103, may be used to increase yaw stiffness. In this case, each pair of mooring cables 103 would be oriented with an angular separation, for example, 60 degrees. The mooring cables resist the shear forces acting on the offshore structure by wind, waves, and ocean currents. In the illustrated embodiment, mooring anchors 107 are used to anchor the mooring lines 103 to the seabed. In the illustrated embodiment, the foundation 105 is located on the seabed.

Figure 2:
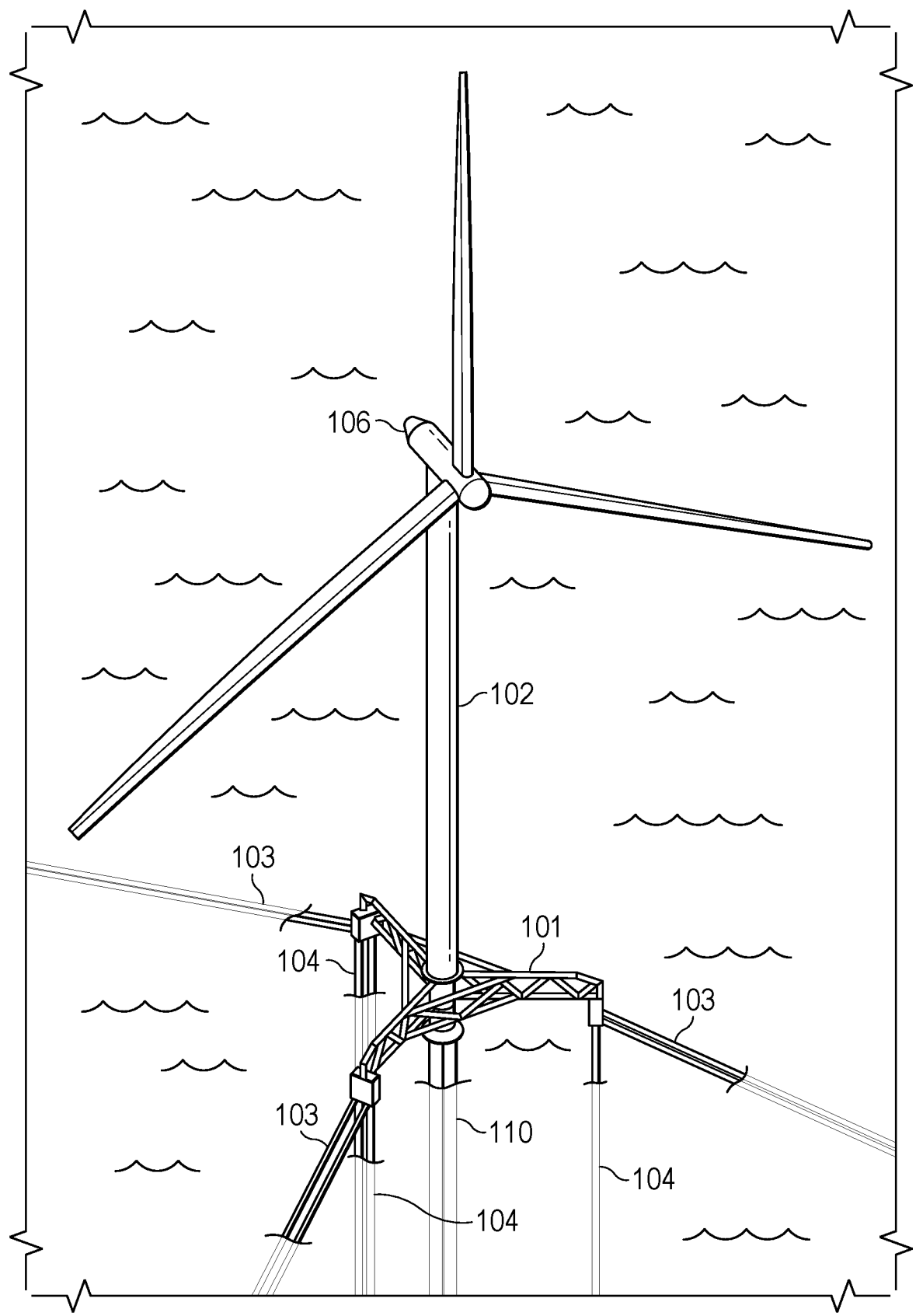
FIG. 2 depicts an offshore wind turbine installation seen from above, in accordance with embodiments of the present disclosure.

FIG. 2 depicts the upper portion of an offshore installation supporting a wind turbine 106, in accordance with embodiments of the present disclosure. In the illustrated embodiment, the offshore structure is not a floating hull because the vertical support is provided by the column assembly 110 from below the water. The column assembly 110 provides compressive force against the top frame structure 101 in response to the weight of the turbine 106, tower 102, and top frame structure 101, and tension forces applied to tension lines 104 and mooring lines 103, such that the structure is held rigid in its installation location to counteract the impacts of wind, waves, and currents against the offshore structure reducing accelerations and thus mechanical and inertial loads on the turbine tower and turbine in wind turbine applications.

The illustrated embodiment exposes minimal structure to wave and ocean current loads, in comparison to traditional floating platforms. Advantageously, this reduces the mooring and mooring anchor requirements, helping to minimize environmental disturbance during wave and current conditions. Additionally, the design provides a smaller footprint than a traditional catenary-moored floating platform because of the reduced mooring requirements, thus providing more space between the offshore installations for vessel movement.

Detailed Description of Components

The column assembly 110 is connected to a top frame structure 101 and a foundation 105. As illustrated in FIG. 1, the column assembly 110 may be a space-frame, but persons of skill in the art would understand that other structures could be used. The column assembly 110 will support the weight of the turbine 106, tower 102, and top frame structure 101 while counteracting the tension in the tension lines 104. A power umbilical may be installed through a tubular within the column assembly 110, entering the column assembly 110 at a point near the top structure end and exiting at a point near the foundation end. This is advantageous because the umbilical is shielded from wave and current loading and thus dynamic loads and associated fatigue damage is reduced. Alternatively, the power umbilical may be clamped to the outside of the column assembly 110 or a tension line 104.

In certain embodiments, the top and bottom ends of the column assembly 110 are connected to the top frame structure 101 and foundation 105, respectively, with flexible connections allowing rotation in any direction. In certain embodiments, the connections between the upper and bottom ends of the column assembly 110 and the top frame structure 101 and foundation 105 are fixed. It would be understood by one of skill that a fixed connection would allow limited rotational freedom while maintaining axial stiffness. As would be understood by one of skill in the art, any combination of fixed or flexible connections may be used, depending on the design requirements. In some embodiments, it may be beneficial to use a pinned connection during operation but lock the connection during installation.

In some embodiments, for example in shallow areas, it may be beneficial to use a large diameter single pipe for the column assembly 110.

In other embodiments, as many as four or five pipes could be used. It would be understood by one of skill in the art that the diameter of the pipes could range from 36 inches to 60 inches, or more, in some embodiments.

Figure 3:
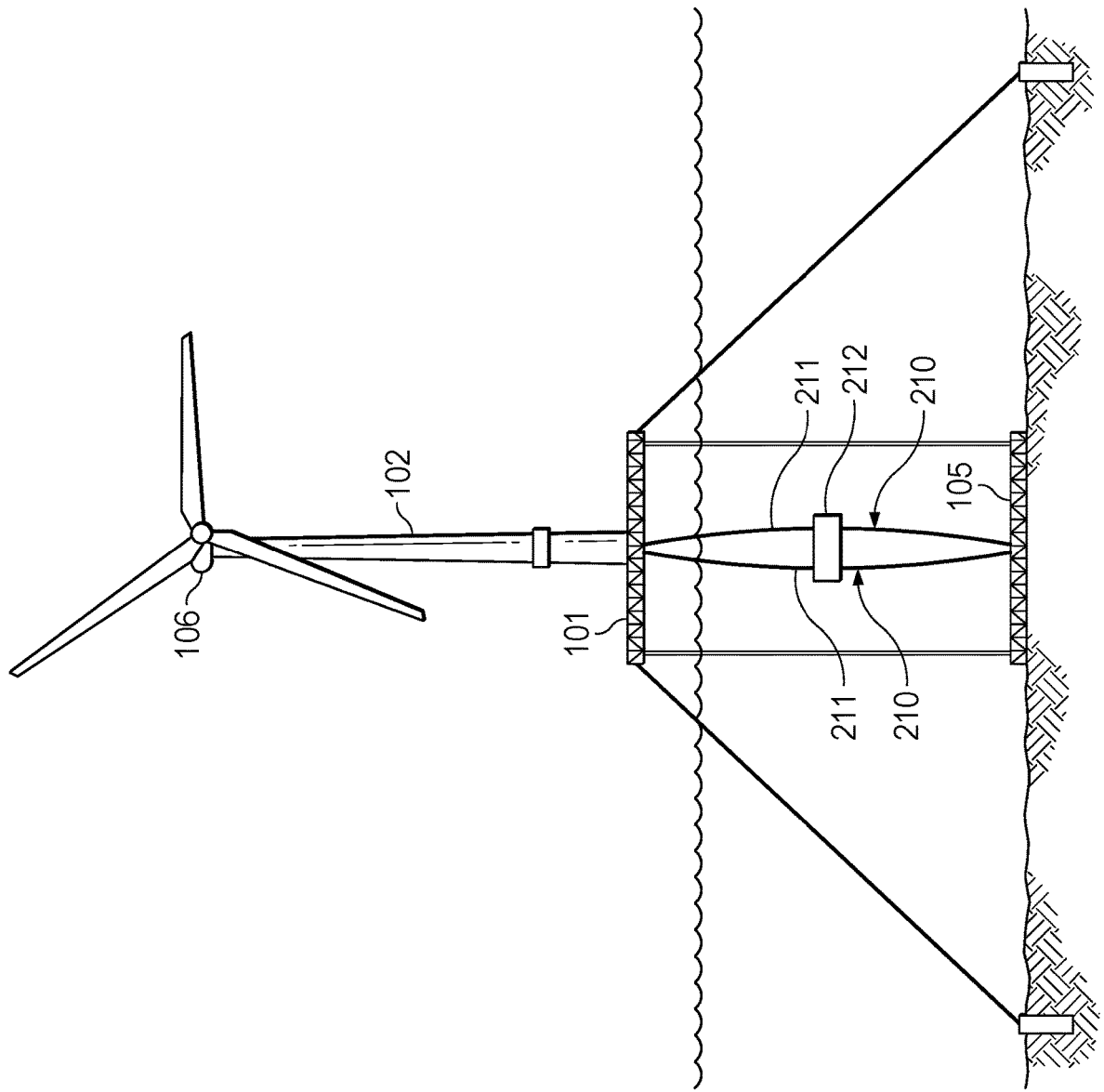
FIG. 3 depicts a schematic drawing of a wind platform with a column spring assembly, in accordance with embodiments of the present disclosure.

As illustrated in FIG. 3, in some embodiments a column spring assembly 210 may be connected to top frame structure 101 and foundation 105. The column spring assembly 210 is designed to resist global buckling. In certain embodiments, a varying compound section along its length may be used. In the illustrated embodiment, the column spring assembly 210 includes compression members 211 that extend from top frame structure 101 to the foundation 105. The compression members 211 may be preloaded by the tensioning of tension lines 104. As noted, this preloaded compression is thereby increased to the operational state by increasing the tension on the tension lines 104. The tension lines 104 provide additional constraint against movement of top frame structure 101, thereby providing added stability.

In the illustrated embodiment, the column spring assembly 210 includes at least three compression members 211. The plurality of compression members 211 are supported by a buckle stop or compression member guide 212 which is discussed in further detail below.

In certain embodiments of the column spring assembly 210, the compression members 211 are connected to end plates on the column spring assembly 210 by pins orthogonal to the plane of bending dictated by the slots in the buckle stop or compression member guide 212, but may be connected in any number of ways that would be apparent to one of skill in the art.

Figure 4:
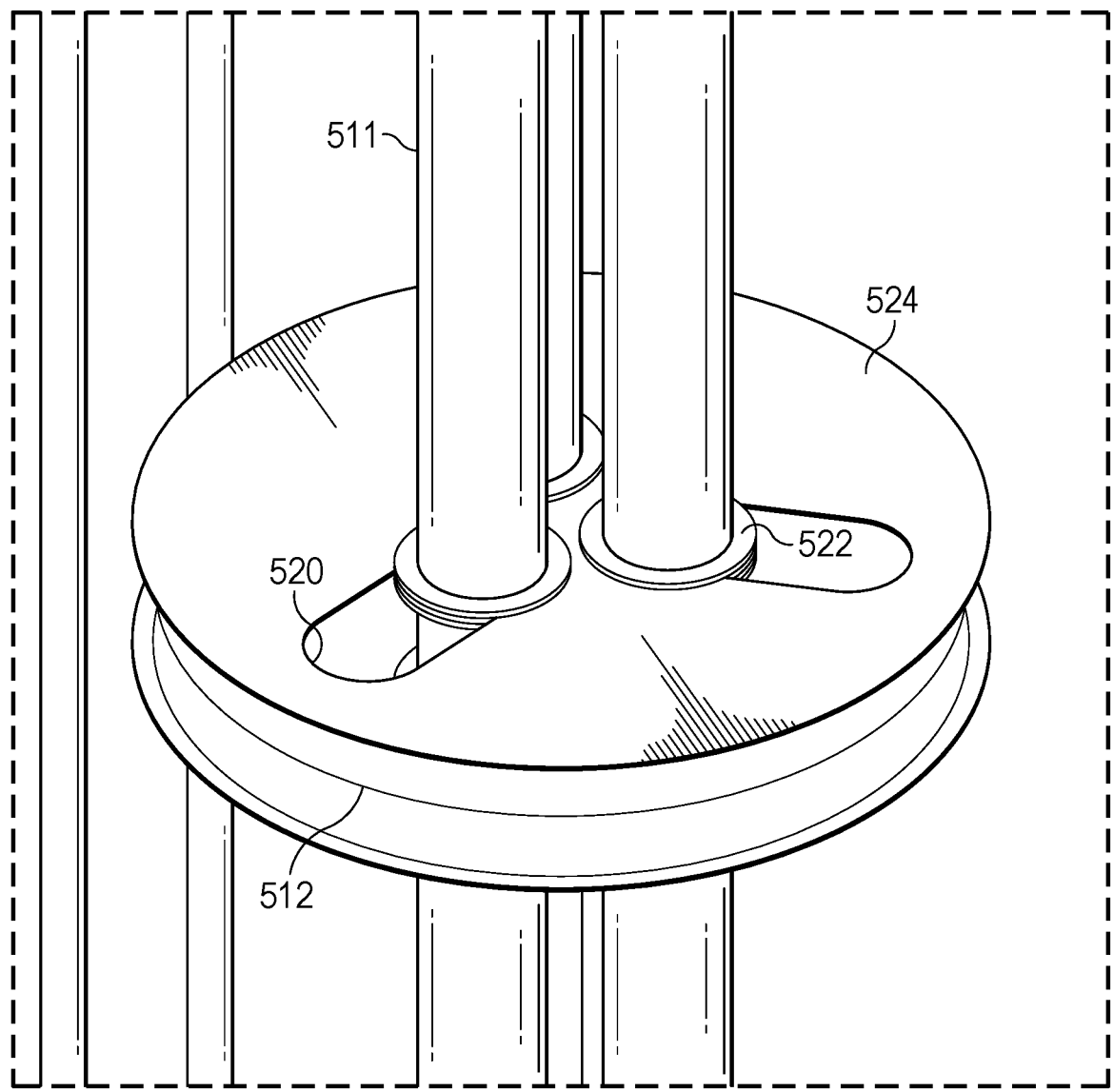
FIG. 4 depicts a compression guide member isometric, in accordance with the embodiments of the present disclosure.

FIG. 4 depicts an isometric view of a buckle stop 512, in accordance with the embodiments of the present disclosure. The buckle stop 512 allows each compression member 511 to deflect outward from the center of the assembly towards the external portion of a guide body 524, thereby increasing the compound section second moment of area, but limiting the deflection and ultimately restraining the compression members 511 laterally against each other to prevent global buckling of the individual compression members 511 and therefore of the composite column spring assembly 210.

In the illustrated embodiment, there are three compression members 511. Each compression member 511 passes through buckle stop 512. The buckle stop 512 includes a guide slot 520 for each compression member 511. In the illustrated embodiment, a guide retainer 522 is installed on each compression member 511. The guide retainer 522 may be installed on the compression member 511 after it is positioned in the buckle stop 512 so that a guide retainer 522 may be positioned on each side of the guide slot 520 to hold the buckle stop 512 in its intended position.

A person of ordinary skill in the art would understand that any mechanical connection, including but not limited to buckle stop 512, could be positioned at any point between the top frame structure 101 and the foundation 105. A person of ordinary skill in the art would understand that when the mechanical connection is a compression member guide it is advantageous to position the compression member guide equidistant between the top frame structure 101 and the foundation 105 to optimize buckling capacity. A person of ordinary skill in the art would also understand that in some instances it is advantageous to include multiple mechanical connections positioned between the top frame structure 101 and the foundation 105. In some embodiments, the mechanical connection is formed with standard structural grade steel such as API 2H Grade 50.

Figure 5A:
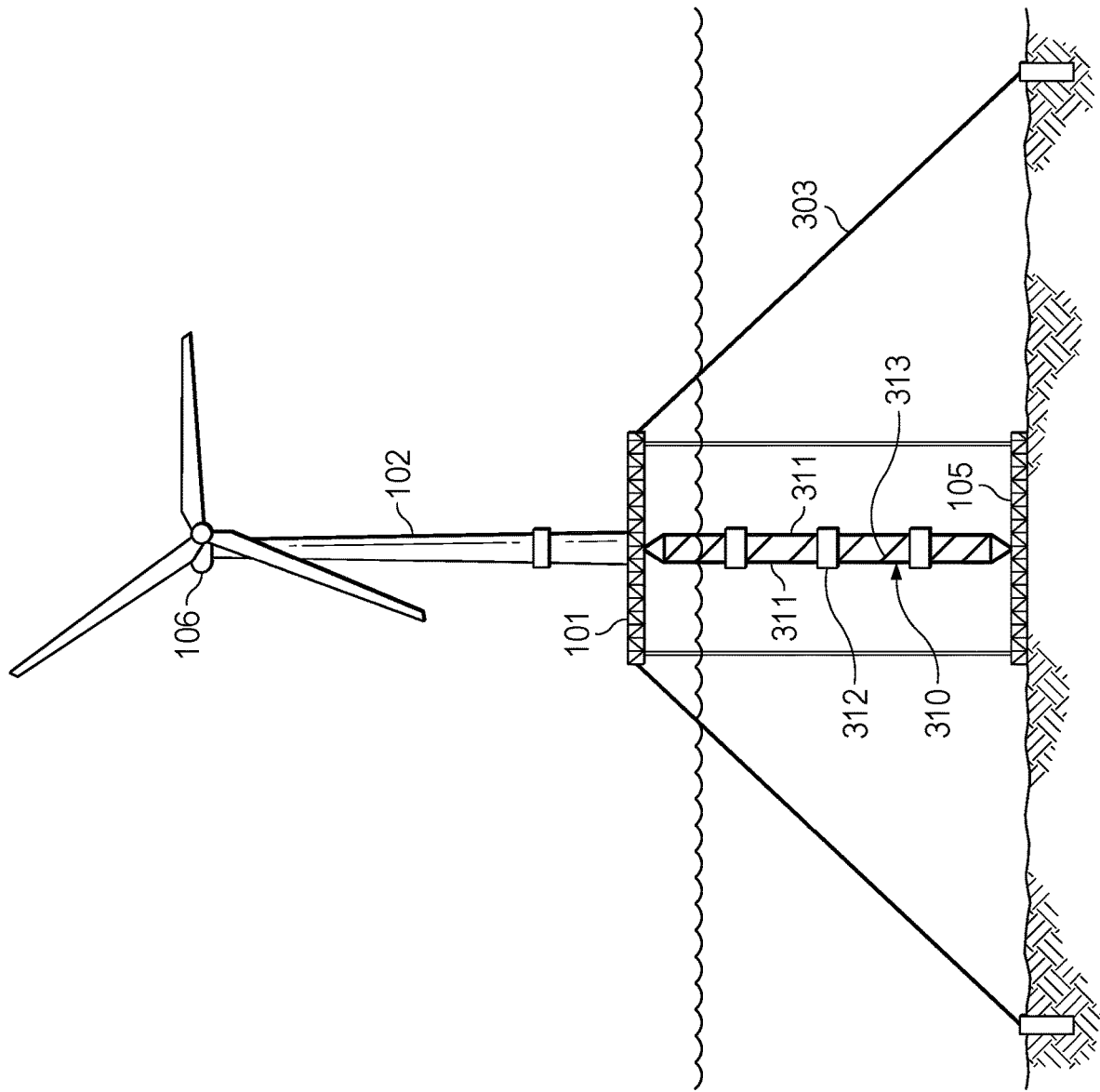
FIG. 5A depicts a schematic drawing of a wind platform with a lattice tower assembly, in accordance with the embodiments of the present disclosure.

As illustrated in FIG. 5A, in some embodiments the column assembly is a lattice tower column assembly 310. In this embodiment, straight pipes are used rather than pipes that are intended to deflect outward, as in the embodiment of the column spring assembly 210 discussed above. As in the column spring assembly 210 discussed above, the lattice tower column assembly 310 includes pipes 311 that extend from the top frame structure 101 to the foundation 105. The lattice tower column assembly 310 may include cross-bracing 313. The cross-bracing 313 may be fitted to the column assembly using friction clamps. In other embodiments, the diagonal cross-bracing 313 is welded to the column assembly. The cross-bracing 313 distributes shear forces within the column assembly. Cross-bracing between pipes 311 may be in any configuration, including but not limited to, horizontal, vertical, or diagonal. One of ordinary skill in the art will understand that the particular configuration of any cross-bracing will depend on the conditions at the installation site, the equipment installed on top frame structure 101, and potentially other variables specific to a particular location.

It would be understood by one of skill in the art that the column assembly 110 connected to the top frame structure 101 and foundation 105 could be any arrangement that provides sufficient strength and stability to support the weight of the system and the downward force of the tension lines 104 and taut moorings 103, providing stability to the top frame structure 101.

In some embodiments, the space-frame, column spring assembly, lattice tower column assembly, pipes, or other structure connected to the top frame structure 101 and foundation 105 may be modular. As illustrated in FIG. 5A, for the lattice tower column assembly 310, plates 312 may be included to support connection between modules and provide additional strength, which is discussed in further detail below. Alternatively, the modules of a modular column assembly may be joined together using any suitable pipe connector.

Figure 5B:
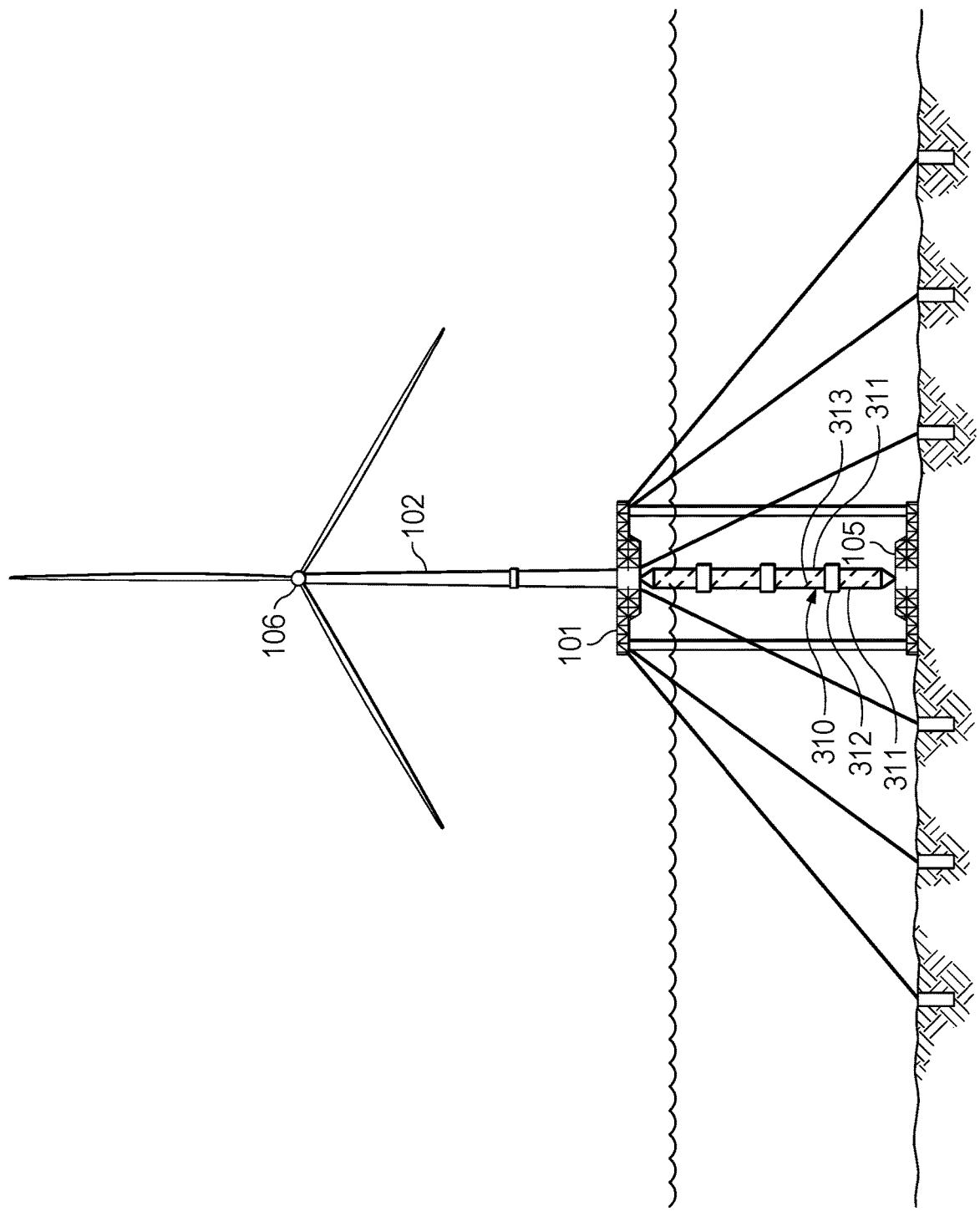
FIG. 5B depicts an alternate embodiment of the configuration shown in FIG. 5A, with a plurality of mooring lines attached to the top frame structure at different locations.

As illustrated in FIG. 5B, an exemplary offshore installation may include lateral supports such as mooring lines attached to the top frame structure at a plurality of different points. For example, towards an outer edge of top frame structure 101, multiple mooring lines 303 may be attached, with each such line being anchored to the sea floor at a different location in terms of the lateral distance from foundation 105. In addition, other mooring lines 303 may be attached at a location towards the center of top frame structure 101, i.e., closer to the point at which the lattice tower column assembly 310 is attached to top frame structure 101. One of ordinary skill in the art will appreciate that, for any of the embodiments disclosed herein, any number of lateral supports may be used and attached at any location, as dictated by the particular conditions at the installation site.

Figure 6:
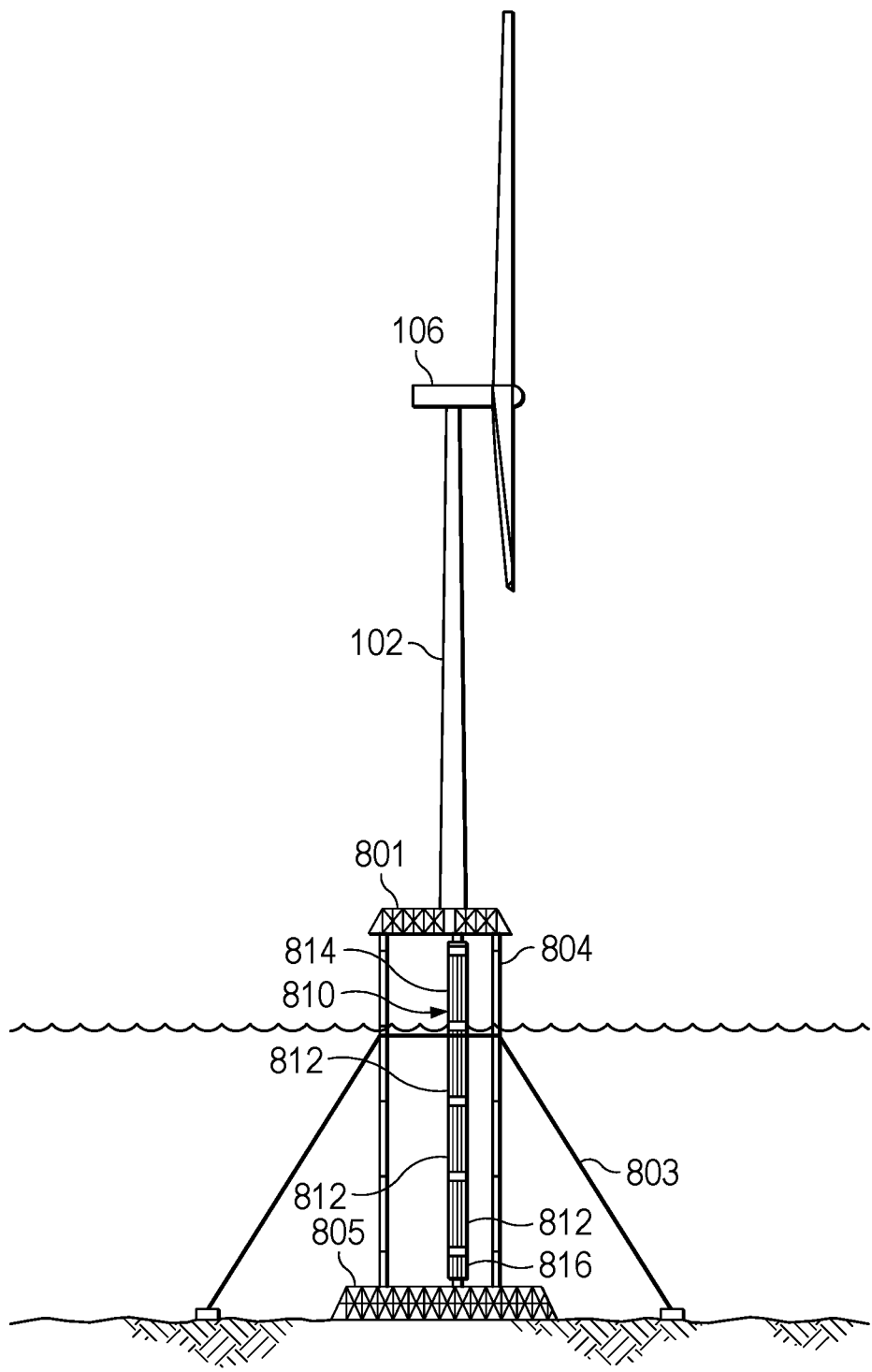
FIG. 6 depicts a schematic drawing of a wind platform with modular assembly, in accordance with the embodiments of the present disclosure.

As shown in FIG. 6, the modular column assembly 810 may be formed by a plurality of pre-fabricated joint bundles 812, 814, 816 with mechanical connections attached at each end of the joints such that they are easily transported to a location convenient for final assembly of the joints before installation to form the assembly, or made up during deployment offshore as discussed in further detail below. In certain embodiments, the top and bottom ends of the modular column assembly 810 are connected to the top frame structure 801 and foundation 805 via the top main barrel pup joint 814 and the bottom main barrel pup joint 816, respectively, with flexible connections allowing rotation in any direction. In certain embodiments, the connections between the upper end of the modular column assembly 810 and the top frame structure 801 and the bottom end of the modular column assembly 810 and the foundation 805, are fixed. It would be understood by one of skill that a fixed connection would allow limited rotational freedom while maintaining axial stiffness. As would be understood by one of skill in the art, any combination of fixed or flexible connections may be used depending on the design requirements. In some embodiments, it may be beneficial to use a pinned connection during operation but lock the connection during installation.

In modular embodiments of the column assembly, where one or more mechanical connections are positioned between the top frame structure 101 and the foundation 105, plates 312 as illustrated in FIG. 5A may be used to rigidize the mechanical connections and cause the individual pipes to be constrained to each other. In these embodiments, the compression members or pipes extend through the plates. As will be appreciated by one of ordinary skill in the art, there may be multiple plates at different axial locations along pipes 311, or only a single plate. In certain embodiments, cross bracing 313 (FIG. 5A) may also be used to transfer shear loads between the individual pipes to cause them to act compositely.

Figure 7:
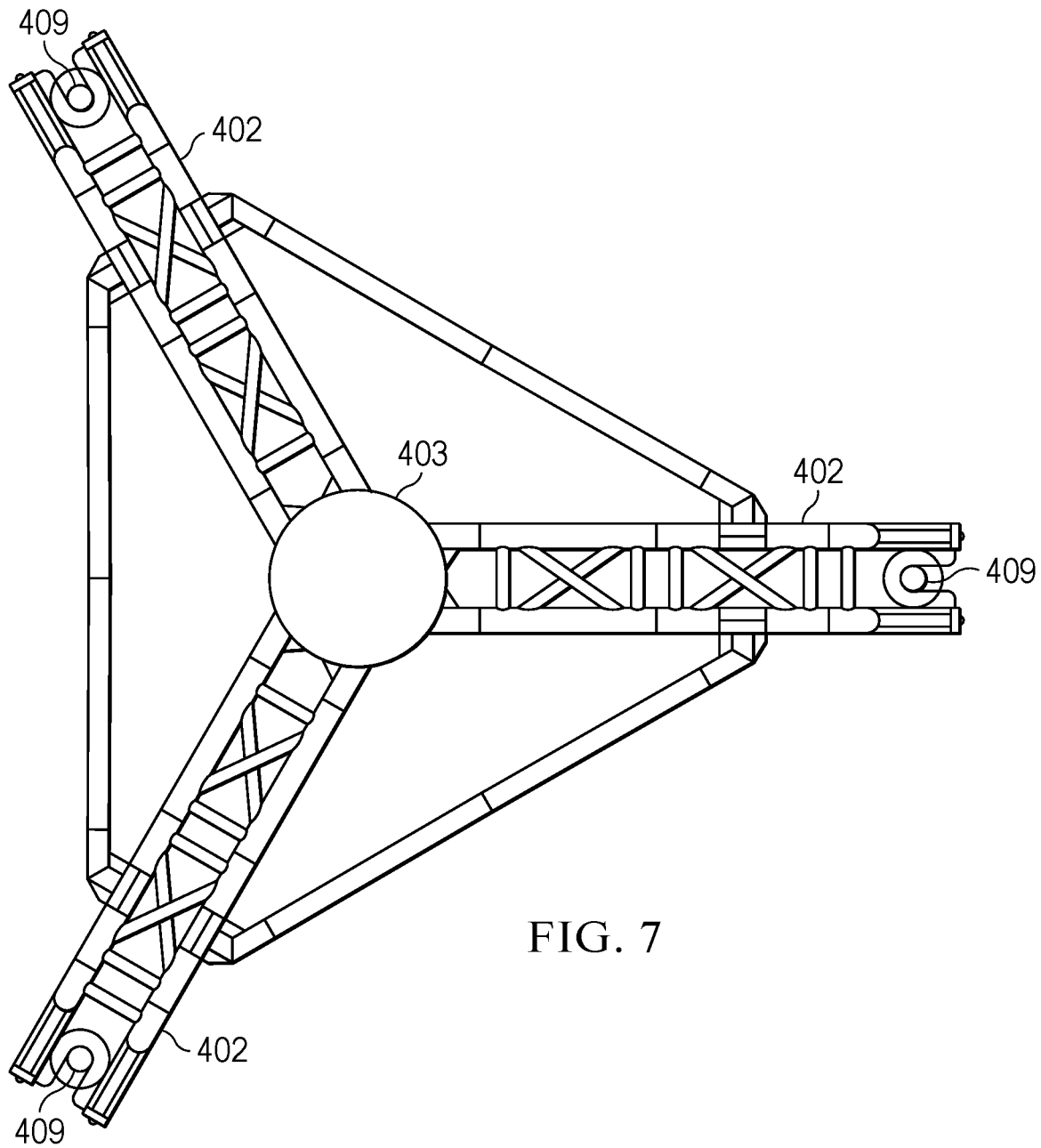
FIG. 7 depicts an embodiment of an offshore top frame structure, in accordance with embodiments of the present disclosure.

The tower 102 and wind turbine 106 are supported by a top frame structure 101. In some embodiments, the top frame structure is a tetrahedral structure with members extending from the tower. As shown in the exemplary embodiment of FIG. 7, the top frame structure 101 has a center point 403 with a plurality of protruding sections 402 that extend out from the center point 403. In certain embodiments, each protruding section 402 of the top frame structure 101 has a truss arrangement. The protruding sections 402 extend out from the center point of the top frame structure 101 to a tendon attachment porch 409 which holds a tension line in tension.

In other embodiments, the top frame structure 101 is a dual plate structure with webbing between the dual plates to provide the required strength and stiffness.

The foundation 105 supports the offshore structure at the base of the column assembly 110 or other similar structure. It would be understood that the foundation 105 could be any number of structures. In some embodiments, the foundation 105 includes a plurality of protruding sections much like the protruding sections 402 of the top frame structure 101. The protruding sections of the foundation 105 connect to the tension lines much like the top frame tendon attachment porch 409 of the top frame structure 101 connects to the tension lines. In certain embodiments, the foundation 105 includes three protruding sections which connect to three tendon attachment porches. It would be understood that the foundation 105 could have any number of protruding sections connected to tension lines 104. In certain embodiments, the foundation 105 may be stabilized on the seafloor by use of weight baskets on each of the protrusions. Separately or in addition, in certain embodiments, mud mats are included to limit penetration of foundation 105 into the seafloor. It would be understood by one of skill in the art that the foundation 105 is designed so that the seabed does not need to be predrilled or anchored.

Figure 8A:
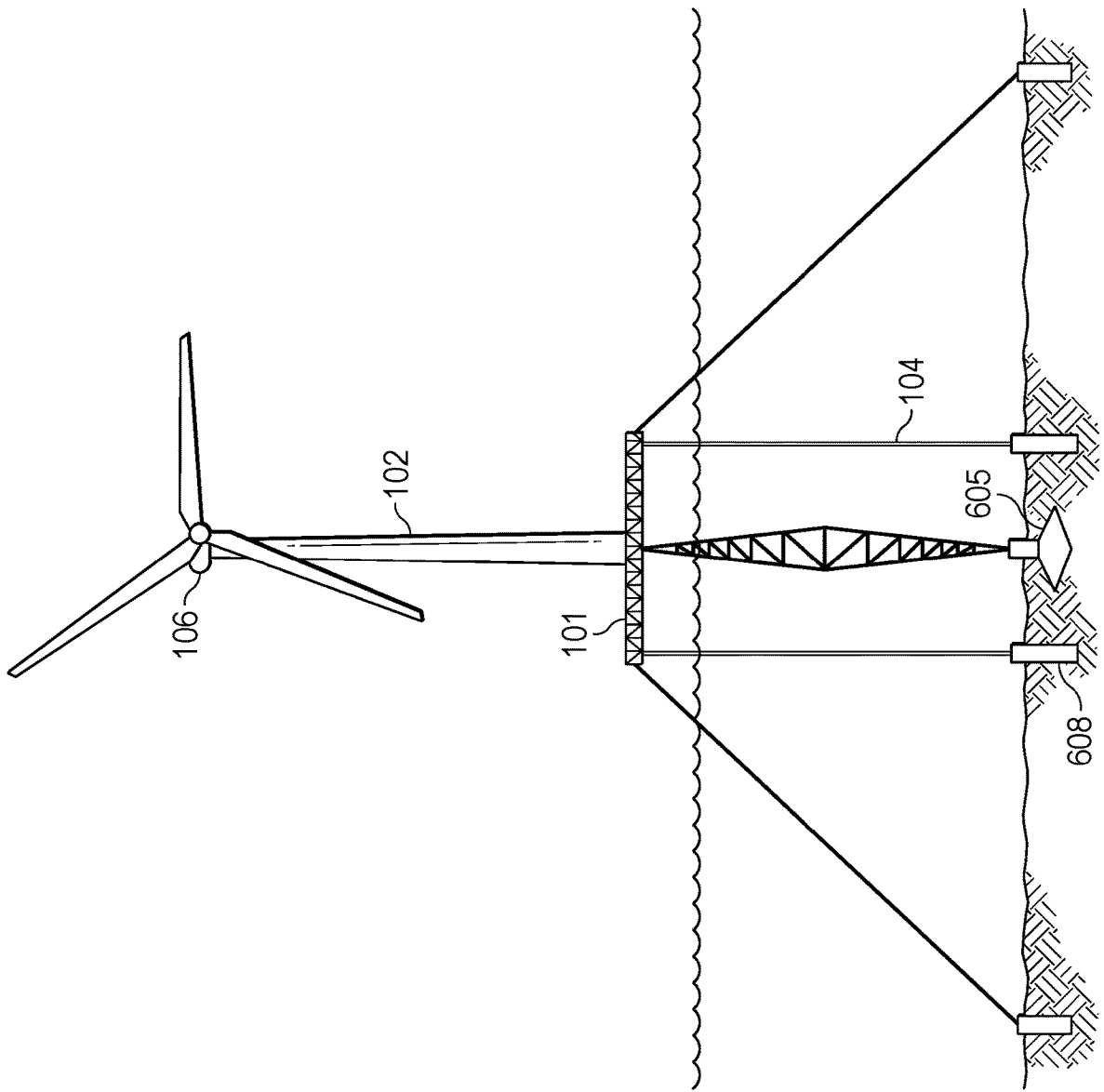
FIG. 8A depicts a schematic drawing of a wind platform with a spud can foundation, in accordance with the embodiments of the present disclosure.
Figure 8B:
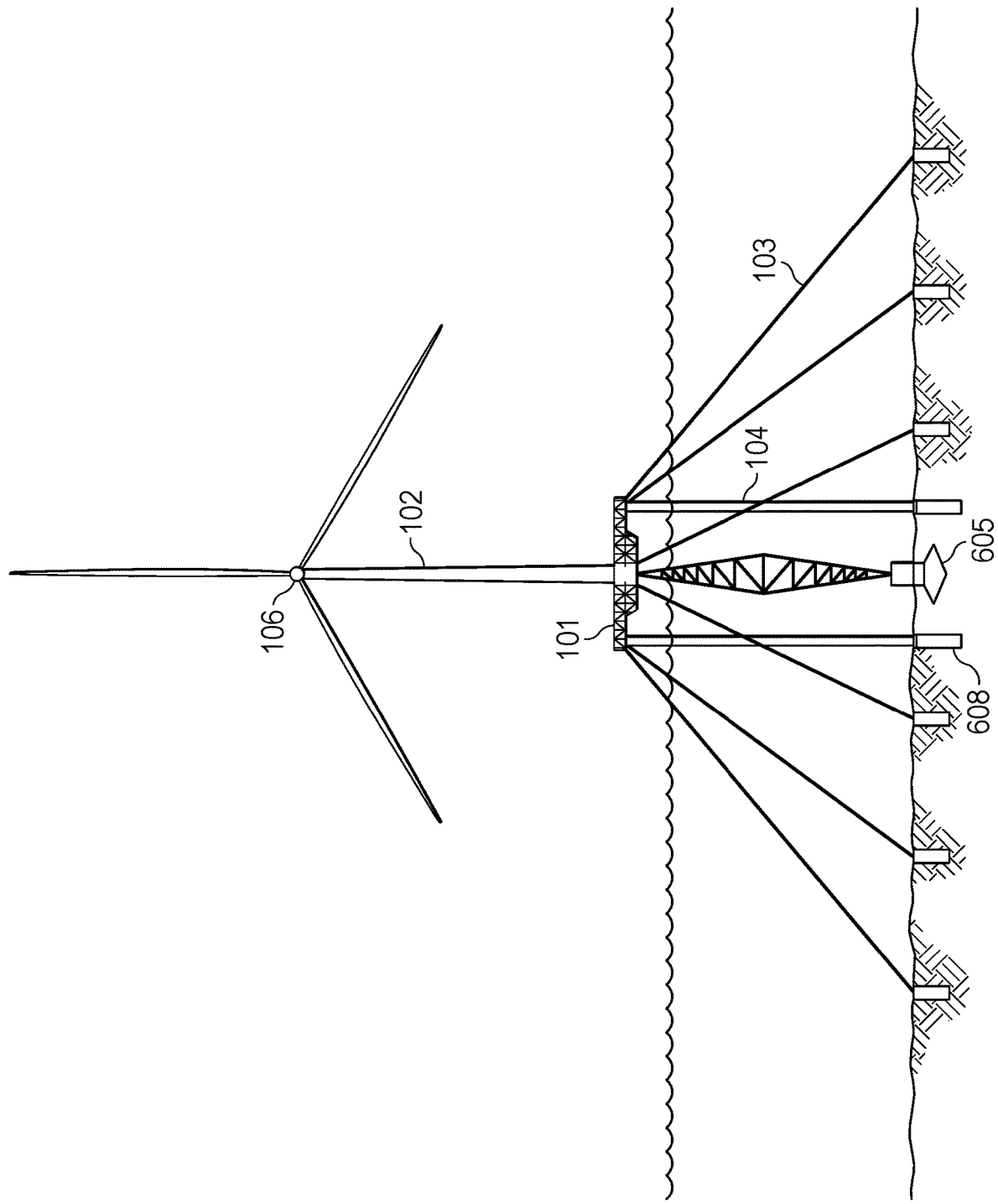
FIG. 8B depicts an alternate embodiment of the configuration shown in FIG. 8A, with a plurality of mooring lines attached to the top frame structure at different locations.

As illustrated in FIG. 8A, the foundation may also be a central spud can 605. The central spud can 605 may provide the axial capacity required to support the equipment weight. In this embodiment, the tension lines 104 are separately attached to piles 608. As illustrated in FIG. 8B, similar to FIG. 5B, this embodiment, like all other disclosed embodiments, may include lateral supports such as mooring lines attached to the top frame structure at a plurality of different points. For example, towards an outer edge of top frame structure 101, multiple mooring lines 103 may be attached, with each such line being anchored to the sea floor at a different location in terms of the lateral distance from central spud can 605. In addition, other mooring lines 103 may be attached at a location towards the center of top frame structure 101, i.e., closer to the point at which the column assembly is attached to top frame structure 101. As noted above, one of ordinary skill in the art will appreciate that, for any of the embodiments disclosed herein, any number of lateral supports may be used and attached at any location, as dictated by the particular conditions at the installation site.

Figure 9:
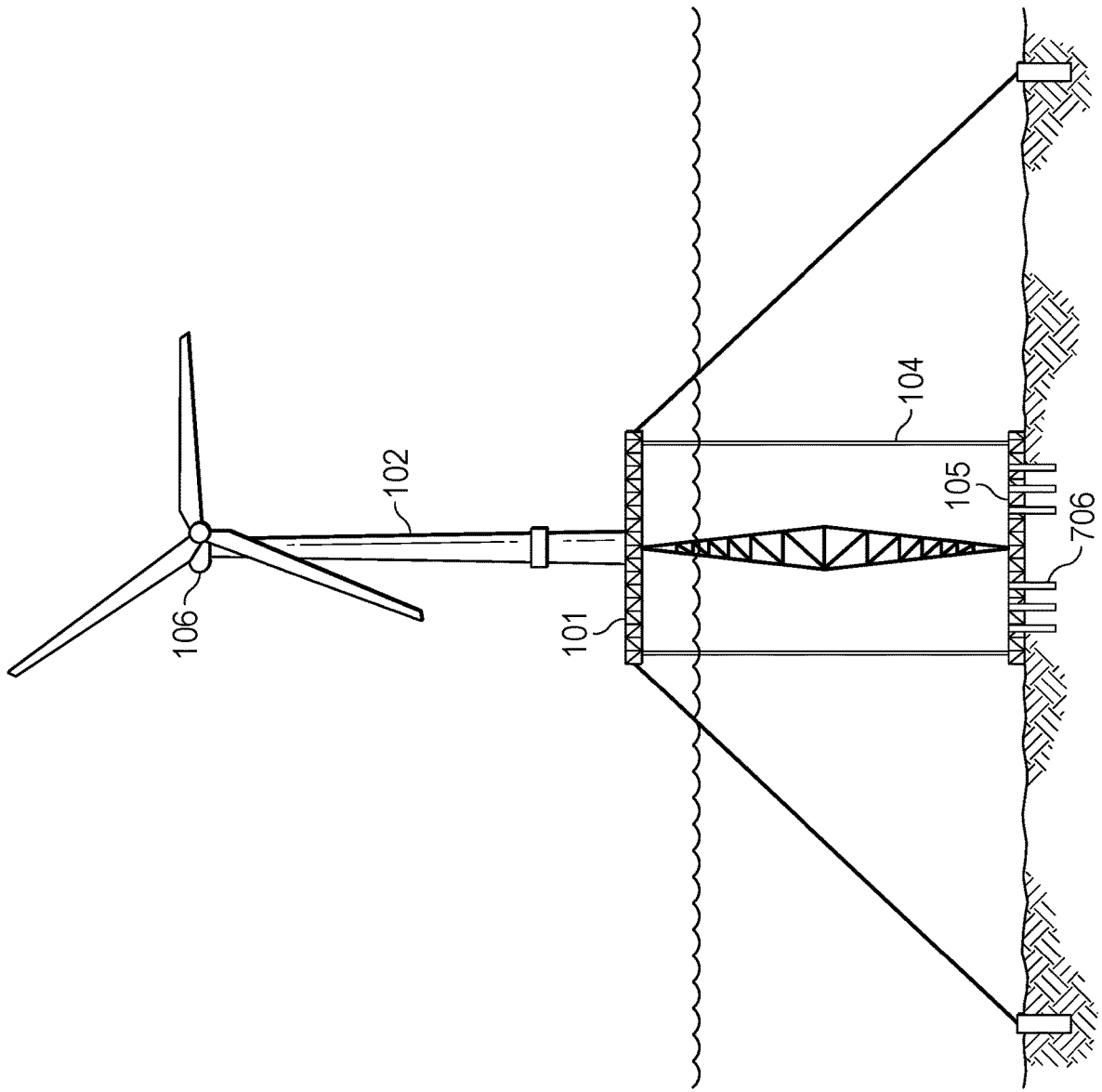
FIG. 9 depicts a schematic drawing of a wind platform with micro-piles, in accordance with the embodiments of the present disclosure.

As illustrated in FIG. 9, in certain embodiments, the foundation 105 is anchored to the seafloor by piles located through pile guides as an alternative to weighted baskets. In certain embodiments, a small number of large piles may be used, whereas in other embodiments more numerous micro-piles 706 may be used to anchor and to optimize the design of the foundation 105. The micro-piles may be located on each leg of the foundation so that the load is transferred to the seabed. One of ordinary skill in the art will understand that the particular foundation configuration will vary depending on the location, as dictated by the particular conditions at the installation site. For example, a central spud can as shown in FIG. 8A might be appropriate at one location, while micro-piles as shown in FIG. 9 might be more appropriate at another location due to differing conditions of the seafloor.

Figure 10:
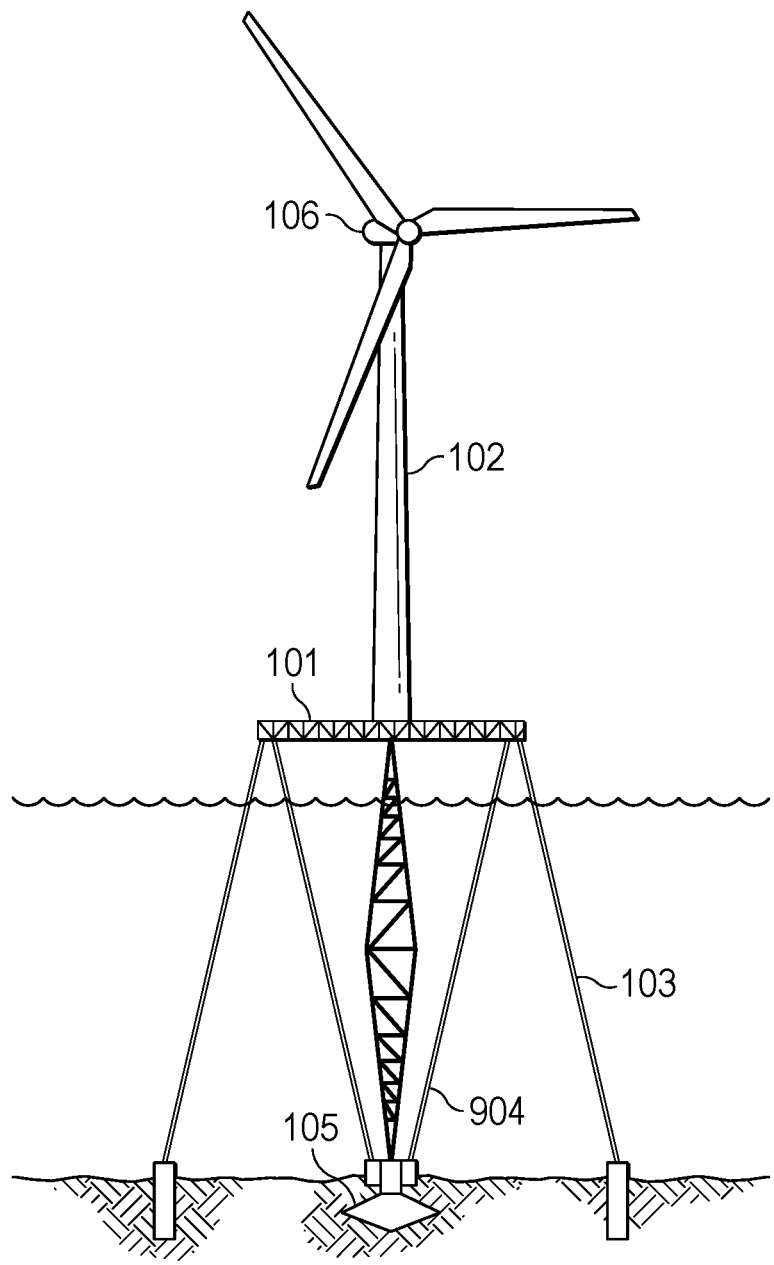
FIG. 10 depicts a schematic drawing of a wind platform with inclined tension lines, in accordance with the embodiments of the present disclosure.

As illustrated in FIG. 10, tension lines 904 may be inclined to connect to the foundation 105 near the center, to reduce the size of the foundation 105. In this case, in certain embodiments, the function of the tension lines 904 and taut mooring lines 103 may be combined such that a "tripod" of three tendons on each arm provides rotational, lateral, and torsional stiffness.

In any of the disclosed embodiments, one of ordinary skill in the art will understand that tendons may be used interchangeably with mooring lines 103, depending on the location, as dictated by the particular conditions at the installation site.

As shown in the illustrated embodiments, the taut mooring lines 103 provide lateral support to the top frame structure 101. The taut mooring lines 103 may be connected to the protruding sections 402 at the tendon attachment porch 409 of the top frame structure 101.

Taut mooring lines are well known to one of ordinary skill in the art and the present disclosure is not limited to any particular type or configuration of such mooring lines. In certain embodiments, a segment of chain is used at each end of the moorings. In certain embodiments, the taut moorings may be synthetic material such as HMPE or aramid. In other embodiments, the taut moorings may be steel pipe or tendons, to maximize stiffness and minimize footprint.

Figure 11:
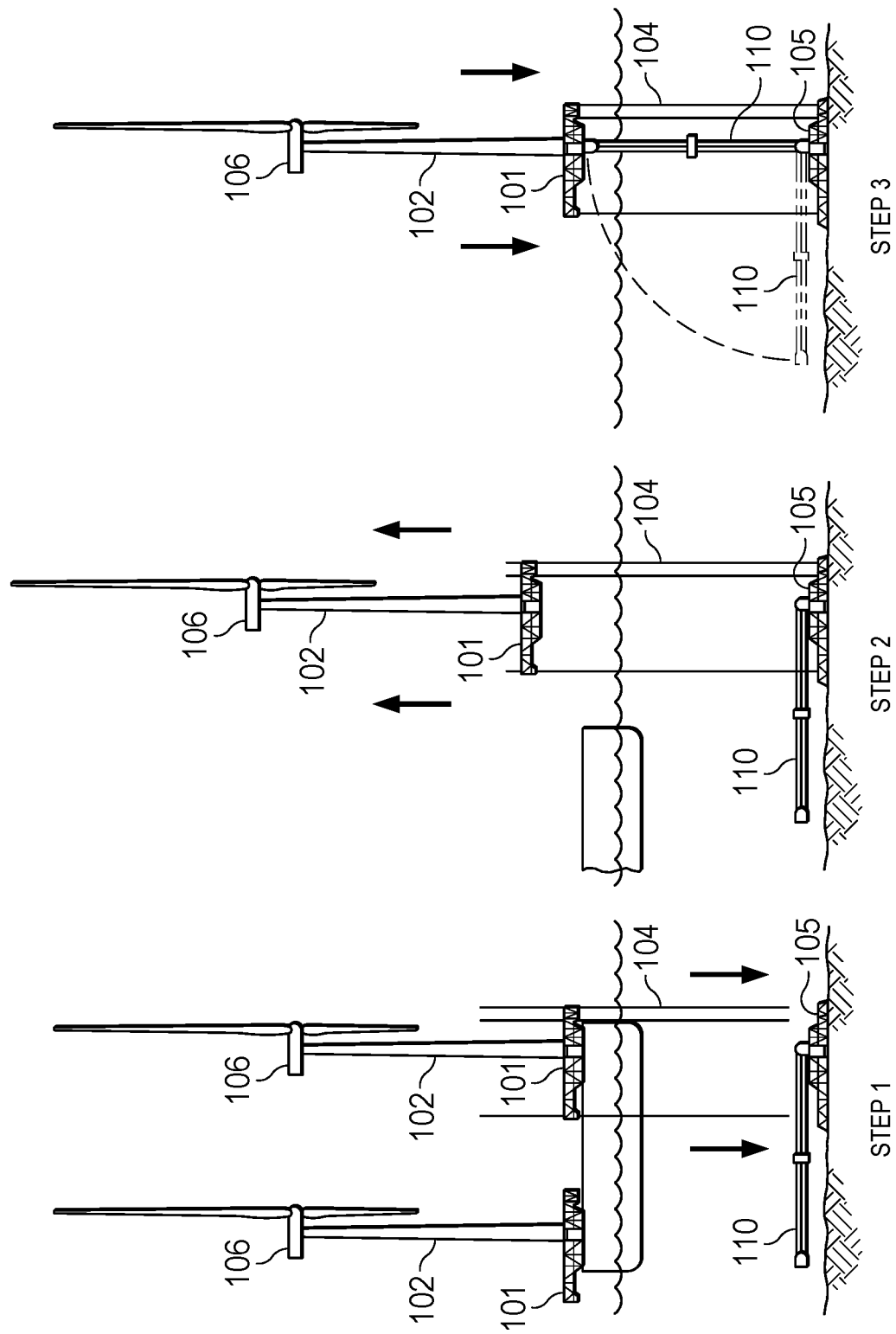
FIG. 11 depicts an installation procedure for the wind turbine platform, in accordance with embodiments of the present disclosure.

FIG. 11 depicts a method for installing an offshore platform, in accordance with embodiments of the present disclosure. In particular, this method may be useful for the installation of smaller turbines in shallower water depths. At step 1, the top frame structure 101 is skidded onto an installation vessel or barge complete with the equipment, in the illustrated embodiment a wind turbine 106, and is floated out to the installation site. The installation site already includes the foundation and column assembly 110 (space-frame, column spring, lattice column tower, or other arrangement). Once the installation vessel or barge is located above the foundation, the tension lines 104 are deployed from the top frame structure to the foundation 105 located on the seabed at the transition site. At step 2, the tension lines 104 are used to jack the top frame structure 101 clear of the installation vessel or barge. In the illustrated embodiment, the tension lines 104 are designed to support the top frame structure 101 temporarily during installation. The installation vessel or barge then departs the area, leaving the top frame structure 101 above the transition site tethered to the foundation 105 via the tension lines 104. At step 3, the column assembly is lifted so that the column assembly 110 connects with the top frame structure. At this point, additional tension lines 104 can be deployed from the top frame structure 101 to the foundation 105. Tension is then applied to the tension lines 104.

Figure 12:
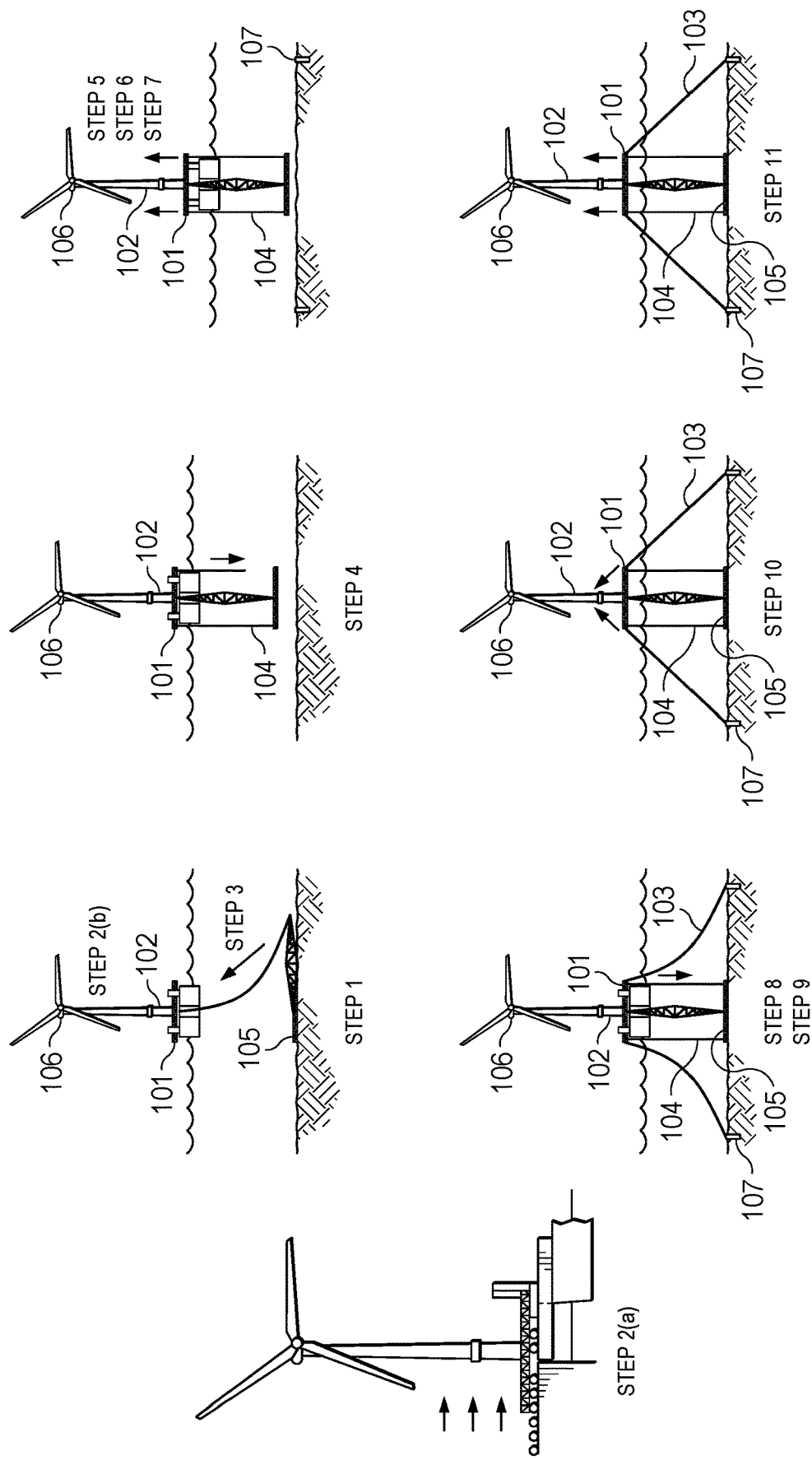
FIG. 12 depicts an alternative installation procedure for the wind turbine platform, in accordance with embodiments of the present disclosure.

FIG. 12 depicts an alternative method for installing an offshore platform, in accordance with embodiments of the present disclosure. As shown in step 1, the installation site already includes the foundation 105 and column assembly 110 (space-frame or other arrangement). At step 2(a), the top frame structure 101 and wind turbine 106 are loaded onto an installation vessel or barge. At step 2(b), the combination of top frame structure 101 and wind turbine 106 is floated out to the installation site. At step 3, the foundation 105 and column assembly 110 are disposed below the ocean surface with column assembly 110 connected to both the top frame structure 101 and the foundation 105, such that the foundation 105 is raised clear of the seafloor. At step 4, the tension lines 104 are deployed from the top frame structure 101 to the foundation 105. At step 5, tension is applied to the tension lines 104 so that the column assembly 110 is compressed. At step 6, the sea-fastening is removed, and the platform is raised on elevators at step 7. The taut mooring anchors 107 are pre-installed at the installation site. At step 8, the taut mooring lines 103 are installed. At step 9, the platform is lowered until the foundation 105 is landed on the seafloor. At step 10, the taut mooring lines 103 are tightened. At step 11, additional tension may be applied to the tension lines 104, if required to offset reduction in tension due to the weight of the turbine 106.

In certain embodiments, a diver-less subsea connection is used to connect the column assembly 110 (or other supporting structure) and the tension lines 104 to the foundation 105.

Figure 13:
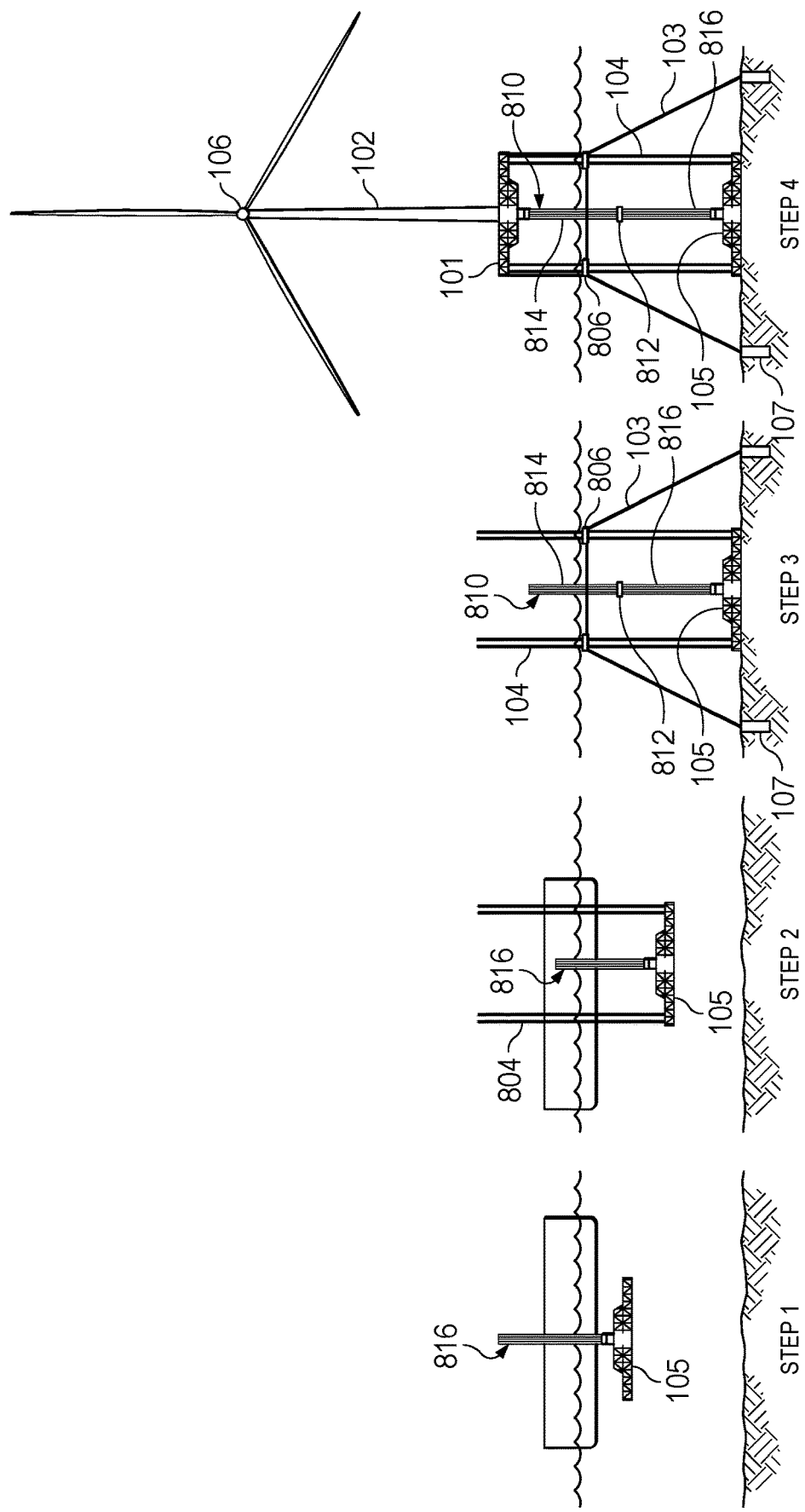
FIG. 13 depicts an alternative installation procedure for the wind turbine platform, in accordance with embodiments of the present disclosure.

FIG. 13 depicts a method for installing an offshore platform, in accordance with embodiments of the present disclosure. In particular, this method could be used for installation of a modular lattice tower or other supporting structure with a modular configuration, as discussed above. At step 1, the foundation 105 is assembled quayside (or at the shore). For example, the foundation could be assembled on a dock. While on shore, the bottom main barrel pup joint bundle 816 is installed onto the foundation 105. At step 2, the foundation 105 is lifted and lowered to the seabed just offshore. For example, the foundation 105 could be lowered to a seabed below or next to the dock. An installation vessel or barge is then floated into position above the foundation 105. The installation vessel or barge will lift the foundation 105 via the bottom main barrel pup joint bundle 816. The bottom main barrel pup joint bundle 816 is then secured to the installation vessel or barge. Once the bottom main barrel pup joint bundle 816 is secured, three tendon pup joints 804 are deployed to the foundation 105 and secured to the installation vessel or barge. The installation vessel or barge is then loaded with all installation equipment and moved to the wind turbine site. At step 3, a first main barrel inter joint bundle 812 is installed to the top of the bottom main barrel pup joint bundle 816. Additionally, a tendon joint 806 is installed to the top of each of the three tendon pup joints 804 already secured to the installation vessel or barge. The entire offshore platform assembly is then lowered. The steps of step 3 are repeated until the foundation 105 approaches the seabed. Once the foundation contacts the seabed, taut moorings 103 are deployed. At step 4, another tendon joint 806 is installed to the top of each of the three tension lines 104 so that the tension line 104 extends above the installation deck. Temporary buoyancy/tension clamps are installed on top main barrel joint bundle 814 and the top of the tension lines 104. Once the clamps are installed, the assembled offshore platform is then lowered to settle on the seabed. The installation vessel or barge is then removed.

In certain embodiments, the materials for installations can be created from components manufactured close by to the installation, such as installations in the North Sea where manufacturing happens in the UK. In certain embodiments, for cases where there is limited local manufacturing capability, the installation can be created from modular components pre-fabricated at low-cost locations and transported to ports close by to the installation for assembly. With pre-manufactured components, the structure may be partially assembled on shore to save with installation time and effort because of the accessibility of the components nearby installation sites with minimal need for exotic components. Additionally, because many installation locations are near ports with standard port water depth, the assembly may be pre-fabricated near shore.

Further, these installations can be installed with standard vessels in transition sites, and the tower can be installed quayside (or at the shore) eliminating the requirements for expensive heavy lift crane barges and vessels. Further, the portion of the installation on the seabed can be pre-installed prior to the installation of the turbine tower section itself, which minimizes the time required of sea vessels during installation of the turbine tower and increases the ability to perform multiple turbine tower installations at once.

Thus, the current design is cost competitive with a fixed tower and floating solution at a time when the offshore wind industry is looking to provide more installations in these transition site depths. This design also provides a reduced environmental impact relative to the other known solutions. In particular, in certain embodiments, the offshore platform described in relation to FIGS. 1-13 above minimizes the piling requirements necessary to anchor the offshore platform. This reduces the amount of noise pollution and makes it favorable for shallow water applications. In addition, the illustrated embodiment exposes minimal structure to wave and ocean current loads, in comparison to traditional floating platforms. Advantageously, this reduces the mooring and mooring anchor requirements, minimizing environmental disturbance during wave and current loading conditions. Additionally, the design provides a smaller footprint than a traditional floating platform because of the reduced mooring requirements, thus providing more space between the offshore installations for vessel movement.

It is understood that variations may be made in the foregoing without departing from the scope of the present disclosure. In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes, and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function. At least one specification heading is required. Please delete this heading section if it is not applicable to your application. For more information regarding the headings of the specification, please see MPEP 608.01(a).

The invention claimed is:

1. An offshore installation comprising:
   a top platform having a weight and comprising a top surface and a bottom surface;
   a foundation configured to be disposed on a seafloor;
   a modular vertical column assembly comprising:
      a central longitudinal axis;
      a first end fixedly connected to the top platform;
      a second end connected to the foundation;
      a first modular vertical support member extending from the first end to the second end, such that the modular vertical column assembly supports the weight of the top platform;
   a first plurality of tendons configured to extend from the top platform to the foundation; and
   a plurality of lateral supports configured to extend from the top platform to the seafloor.

2. The offshore installation of claim 1, wherein the modular vertical column assembly comprises a lattice tower.

3. The offshore installation of claim 1, wherein the top platform further comprises:
   a center point;
   a first leg extending outward from the center point;
   a second leg extending outward from the center point;
   a third leg extending outward from the center point; and
   wherein the first leg, second leg, and third leg are all on a first plane.

4. The offshore installation of claim 1, further comprising a flexible connection between the first end of the modular vertical column assembly and the top platform.

5. The offshore installation of claim 1, further comprising a wind turbine configured to be mounted on the top surface of the top platform.

6. The offshore installation of claim 1, wherein the plurality of lateral supports comprise a second plurality of tendons.

7. The offshore installation of claim 1, wherein:
   the top platform further comprises:
      a center point; and
      at least one leg extending outward from the center point and having a first length; and
   the foundation comprises a base with a radius that is less than the first length of the leg of the top platform, such that the first plurality of tendons provide lateral support to the top platform.

8. A method for installing an offshore installation on a seafloor, comprising:
   mounting offshore equipment on a top frame structure having a weight and comprising a top surface and a bottom surface;
   transporting the top frame structure and offshore equipment to an installation site;
   installing a foundation and a lower portion of a modular vertical column assembly on the seafloor at the installation site;
   positioning the top frame structure above the foundation;
   deploying a first plurality of tendons from the top frame structure to the foundation;
   installing an upper portion of the modular vertical column assembly;
   lifting an end of the modular vertical column assembly to contact the top frame structure, such that the modular vertical column assembly supports the weight of the top frame structure and offshore equipment;
   applying tension to the first plurality of tendons;
   attaching a plurality of lateral supports to the top frame structure; and
   extending the plurality of lateral supports from the top frame structure to the seafloor.

9. The method of claim 8, further comprising lifting the top frame structure clear of an installation vessel before the modular vertical column assembly is lifted to contact the top frame structure.

10. The method of claim 8, wherein the modular vertical column assembly comprises a lattice tower.

11. The method of claim 8, wherein the plurality of lateral supports comprise a second plurality of tendons and the method further comprises the step of applying tension to the second plurality of tendons.

12. The method of claim 8, wherein the offshore equipment comprises a wind turbine.

13. The method of claim 8, wherein:

the top platform further comprises:
- a center point; and
- at least one leg extending outward from the center point and having a first length; and the foundation comprises a base with a radius that is less than the first length of the leg of the top platform, such that the first plurality of tendons provide lateral support to the top platform.

14. A method for installing an offshore installation on a seafloor, comprising:

mounting offshore equipment on a top frame structure having a weight and comprising a top surface and a bottom surface;

transporting the top frame structure and offshore equipment to an installation site;

installing a foundation and a lower portion of a modular vertical column assembly on the seafloor at the installation site;

installing an upper portion of the modular vertical column assembly;

positioning the top frame structure above the foundation;

lifting an end of the modular vertical column assembly to contact the top frame structure, such that the modular vertical column assembly supports the weight of the top frame structure and offshore equipment;

lifting the foundation off the seafloor with the modular vertical column assembly;

deploying a first plurality of tendons from the top frame structure to the foundation;

lowering the foundation to the seafloor via the first plurality of tendons;

applying tension to the first plurality of tendons;

attaching a plurality of lateral supports to the top frame structure; and extending the plurality of lateral supports from the top frame structure to the seafloor.

15. The method of claim 14, wherein the step of attaching the plurality of lateral supports to the top frame structure is performed before the foundation is installed on the sea floor.

16. The method of claim 14, wherein the modular vertical column assembly comprises a lattice tower.

17. The method of claim 14, wherein the offshore equipment comprises a wind turbine.

18. The method of claim 14, wherein the plurality of lateral supports comprise a second plurality of tendons.

19. The method of claim 14, wherein:

the top platform further comprises:
- a center point; and
- at least one leg extending outward from the center point and having a first length; and the foundation comprises a base with a radius that is less than the first length of the leg of the top platform, such that the first plurality of tendons provide lateral support to the top platform.

* * * * *